No. 871,920. PATENTED NOV. 26, 1907.
A. FALKENHAINER.
VEHICLE SPRING.
APPLICATION FILED DEC. 26, 1906.
2 SHEETS—SHEET 1.
Fig. I.
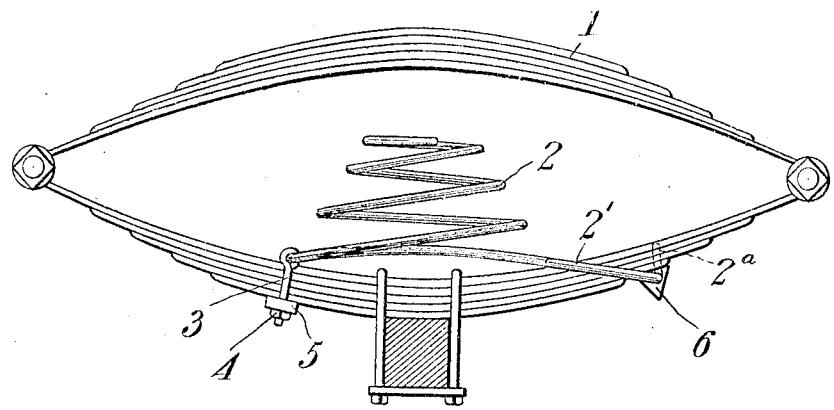
Fig. II.
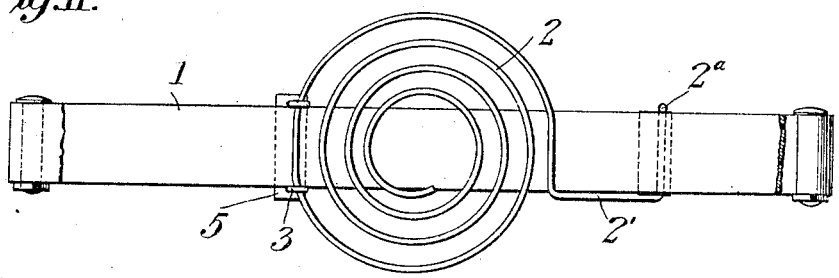
Fig. III.
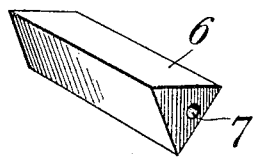
Witnesses:
Fenton S. Belt,
Lily Rost
Inventor:
Arthur Falkenhainer
By Geo. W. Knight
Atty.

No. 871,920.  
PATENTED NOV. 26, 1907.
A. FALKENHAINER.  
VEHICLE SPRING.  
APPLICATION FILED DEC. 26, 1906.
2 SHEETS—SHEET 2.
*Fig. IV.*
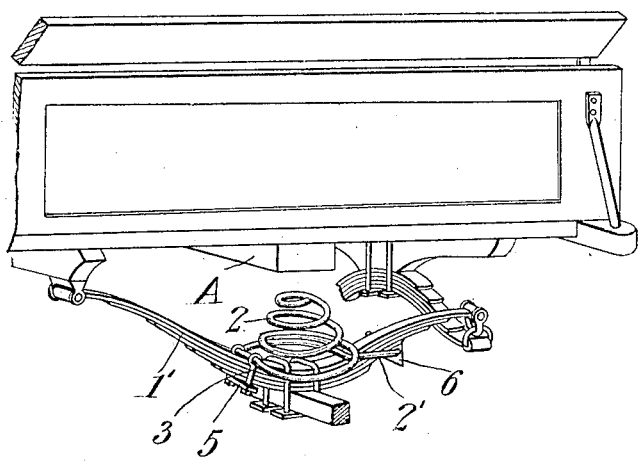
*Fig. V.*
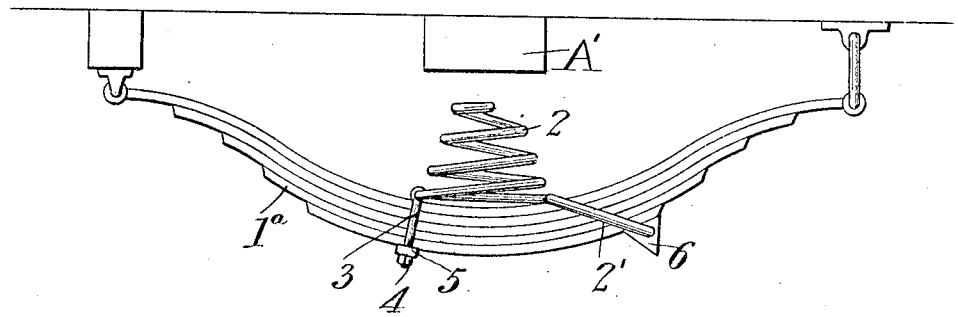
Witnesses:
Inventor:  
Arthur Falkenhainer  
By Geo. W. Knight  
Atty.

UNITED STATES PATENT OFFICE.

ARTHUR FALKENHAINER, OF ST. LOUIS, MISSOURI.

VEHICLE-SPRING.

No. 871,920.  Specification of Letters Patent.  Patented Nov. 26, 1907.

Application filed December 26, 1906. Serial No. 349,367.

*To all whom it may concern:*

Be it known that I, ARTHUR FALKENHAINER, a citizen of the United States of America, residing in the city of St. Louis and State of Missouri, have invented certain new and useful Improvements in Vehicle-Springs, of which the following is a full, clear, and exact description, reference being had to the accompanying drawings, forming part of this specification.

My invention relates to that character of vehicle springs of which an example is to be found in Letters Patent of the United States issued to me March 19, 1901, No. 670,273, and which comprises a main spring and an auxiliary spring, the former being designed to sustain the weight of the load imposed thereon when such load is a light one and the two springs being designed to support such load combinedly when the load is a heavy one.

The object of the present invention is to provide a form of attachment of the auxiliary spring to the main spring, whereby the member of the spring to which said auxiliary spring is applied is permitted to straighten from a bowed condition toward a flat condition without any resistance being offered to such movement by the auxiliary spring or its fastenings and also without liability of the parts becoming broken, due to strain in the straightening of the said member of the main spring.

Figure I is a side elevation of my vehicle spring. Fig. II is a top or plan view of the spring with the upper member of the main spring broken out. Fig. III is an enlarged perspective view of the take-up block used in conjunction with the auxiliary spring and bearing against the member of the main spring. Fig. IV is a perspective view of a vehicle platform spring with my auxiliary spring applied thereto. Fig. V is an elevation of a vehicle spring of the form known as a truck spring with my auxiliary spring applied thereto.

Referring first to Figs. I to III inclusive, I designates an ordinary elliptic spring, such as is commonly used in vehicles. 2 designates an auxiliary helical or coiled spring that is positioned for service within the elliptical or main spring 1. This auxiliary spring is rigidly and immovably connected to one of the members by suitable means, such as I-bolts 3 that are fitted to one of the terminal coils of the auxiliary spring, which are equipped with nuts 4 and pass through binding plates 5 between which and the terminal coil of the auxiliary spring the member of the main spring to which the auxiliary spring is applied, is gripped for the purpose of holding the auxiliary spring to the main spring. The terminal coil of the auxiliary spring referred to is provided with an arm 2' that extends parallel with one of the sides of the member of the main spring to which the auxiliary spring is applied, then transversely of said member beneath it and then upwardly at the opposite side of the spring member in the form of a retaining finger 2ª that serves to prevent lateral movement of the spring arm or displacement thereof from its position in engagement with the main spring. The portion of the arm 2' which extends transversely of the main spring member to which the auxiliary spring is applied, has fitted to it a take-up block 6 of polygonal shape and preferably triangular in cross section and in this block is a bore 7 extending longitudinally therethrough and offset from the center of the block in order that the distances between said bore and the sides of the block may be different in degree. The take-up block is adapted to bear against the member of the main spring to which the auxiliary spring is applied. When in the use of my vehicle spring a light load is imposed upon the main spring, such spring yields as usual without the auxiliary spring being brought into service. When, however, a heavier load is imposed on the main spring its upper member moves downwardly and touches the auxiliary spring after which, in its continued movement, the auxiliary spring serves to assist in carrying the load imposed initially on the main spring. As the lower member of the main spring, or that to which the auxiliary main spring is applied, straightens from its bowed form toward a flat form the take-up block 6 carried by the arm of the auxiliary spring rides in contact with said main spring member and permits its straightening action without any detrimental effect, either in connection with the main spring, or the auxiliary spring while at the same time the auxiliary spring is adequately supported in its operative position, due to the bearing of the free portion of its lower terminal coil upon the top of the lower member of the main spring. The take-up block 6 being formed as described, is susceptible of utility in properly positioning the arm 2' of the auxiliary spring relative to the member of the main spring to which the auxiliary spring is applied, according to the thickness of such main spring member. For example, if the main spring member is a thick one the take-up block is so positioned that its bore will be nearest to the main spring member, whereas, if the main spring member is a thin one the take-up block is turned to carry the transverse portion of the arm 2' farther away from the main spring member. It is obvious that the take-up block might, if desired, be dispensed with and the desired sliding engagement between the auxiliary spring and the main spring secured by having the transverse portion of the arm of the auxiliary spring bear directly against the member of the main spring to which the auxiliary spring is applied.

In Fig. IV I have shown my auxiliary spring used in connection with a member 1' of a vehicle platform spring. In this use of the auxiliary spring its operation is the same as in the use of an elliptic spring, the auxiliary spring being designed in this instance to be brought into action by the engagement therewith of a part such as a timber A carried by the body of the vehicle.
In Fig. V I have shown my auxiliary spring applied to a vehicle spring 1ᵃ of the truck type. In this use of the auxiliary spring it is brought into action by a part, such as a timber A', which is carried by the body of the vehicle in a similar manner to that specified in the use of the auxiliary spring in connection with a platform spring.

I claim:

1. In a vehicle spring, the combination with a main spring, of a coiled auxiliary spring having a terminal coil provided with an arm arranged for slidable engagement with a member of said main spring, and means whereby said terminal coil is rigidly and immovably secured to said main spring member, substantially as set forth.

2. In a vehicle spring, the combination with a main spring, of a coiled auxiliary spring having a terminal coil provided with an arm arranged for slidable engagement with a member of said main spring, and means rigidly and immovably connecting said terminal coil to said main spring member, at a point substantially diametrically opposite to that at which the arm of the coil engages said member, substantially as set forth.

3. In a vehicle spring, the combination with a main spring, of a coiled auxiliary spring having a terminal coil provided with an arm arranged for slidable engagement with a member of said main spring, and means whereby said terminal coil is rigidly and immovably secured to said main spring member; said arm being extended transversely of said main spring member at the side thereof opposite to that against which said terminal coil bears, substantially as set forth.

4. In a vehicle spring, the combination with a main spring, of a coiled auxiliary spring having a terminal coil provided with an arm arranged for slidable engagement with a member of said main spring, and means whereby said terminal coil is rigidly and immovably secured to said main spring member; said arm being extended transversely of said main spring member at the side thereof opposite to that against which said terminal coil bears and terminating in a finger engaging an edge of said main spring member, substantially as set forth.

5. In a vehicle spring, the combination of a main spring, a coiled auxiliary spring having one of its terminal coils secured to said main spring and provided with an arm extending transversely of and having slidable engagement with the main spring member to which the auxiliary spring is applied, and a take-up block carried by said arm, substantially as set forth.

6. In a vehicle spring, the combination of a main spring, a coiled auxiliary spring having one of its terminal coils secured to said main spring and provided with an arm extending transversely of and having slidable engagement with the main spring member to which the auxiliary spring is applied, and a polygonal shaped take-up block loosely fitted to said arm, substantially as set forth.

7. In a vehicle spring, the combination of a main spring, a coiled auxiliary spring having one of its terminal coils secured to said main spring and provided with an arm extending transversely of and having slidable engagement with the main spring member to which the auxiliary spring is applied, and a polygonal shaped take-up block loosely fitted to said arm; said block being provided with a bore offset from its center, in which said arm is fitted, substantially as set forth.

ARTHUR FALKENHAINER.

In presence of—
BLANCHE HOGAN,
LILY POST.